F. S. MANNON.
MOWING MACHINE.
APPLICATION FILED MAY 19, 1916.

1,203,890.

Patented Nov. 7, 1916.
3 SHEETS—SHEET 2.

WITNESSES

INVENTOR
Francis S. Mannon
BY
ATTORNEY

F. S. MANNON.
MOWING MACHINE.
APPLICATION FILED MAY 19, 1915.
1,203,890.
Patented Nov. 7, 1916.
3 SHEETS—SHEET 3.
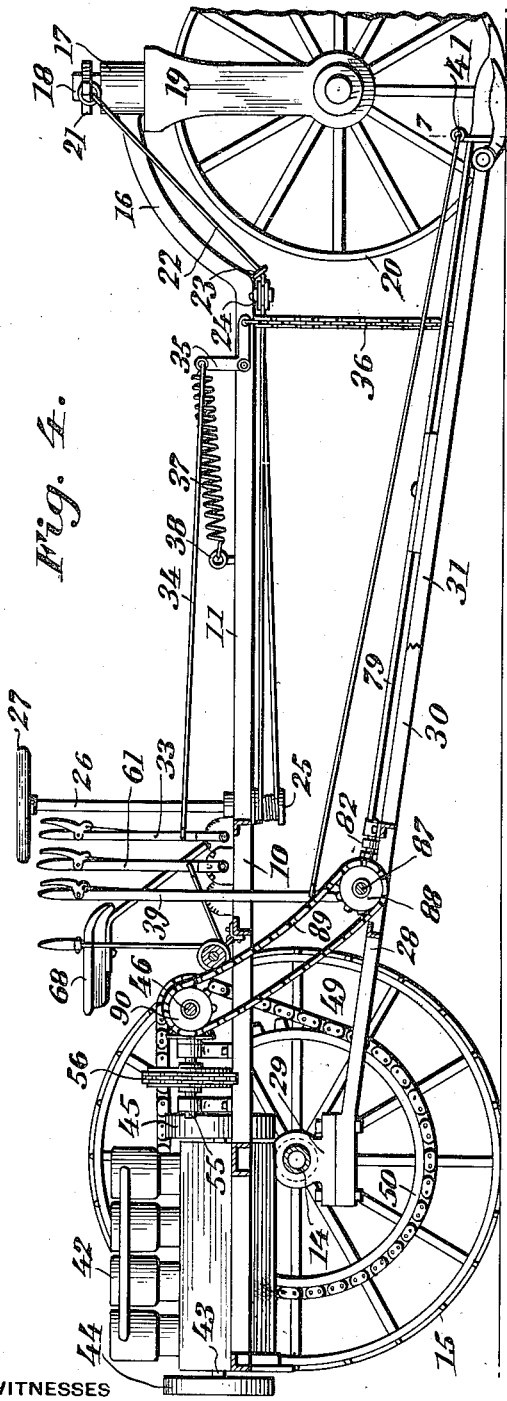
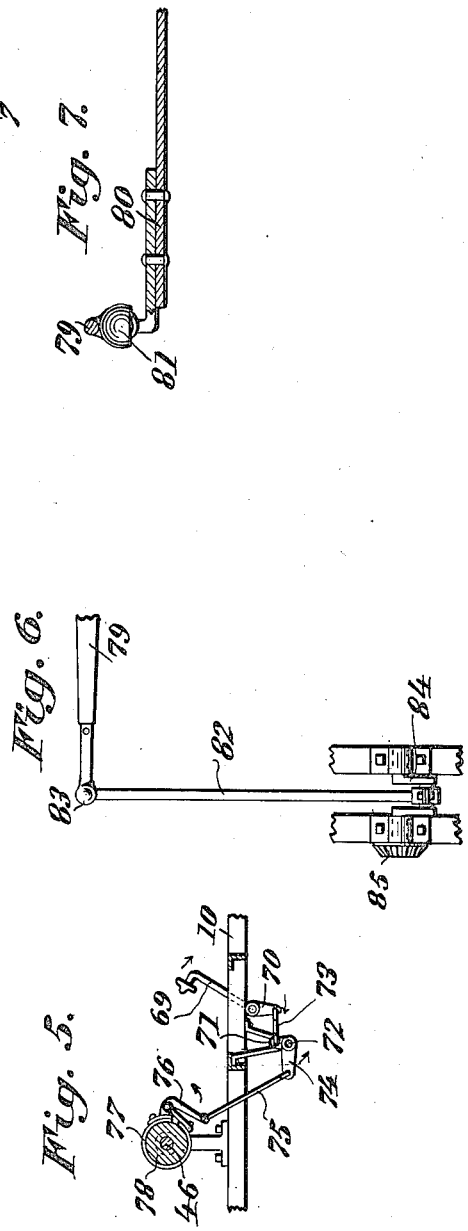
INVENTOR
Francis S. Mannon
WITNESSES
BY Richard B. Owen,
ATTORNEY

800
UNITED STATES PATENT OFFICE.

FRANCIS S. MANNON, OF NEWPORT, OREGON.

MOWING-MACHINE.

1,203,890.

Specification of Letters Patent.

Patented Nov. 7, 1916.

Application filed May 19, 1916. Serial No. 98,641.

*To all whom it may concern:*

Be it known that I, FRANCIS S. MANNON, a citizen of the United States, residing at Newport, in the county of Lincoln and State of Oregon, have invented certain new and useful Improvements in Mowing-Machines, of which the following is a specification.

This invention relates to an improved mowing machine of the motor driven type and the principal object is to provide a mowing machine having an improved frame construction and to further provide a mowing machine having improved motor operating means for driving the machine across a field and to further provide motor operating means for actuating the cutting knives.

Another object of the invention is to so construct the machine that the frame may be provided with a main frame and an auxiliary frame which carries the cutting knives and is pivotally suspended beneath the main frame and releasably held in an adjusted position.

Another object of the invention is to so mount the sickle bar that it may be tilted vertically.

Another object of the invention is to so construct the machine and the frame thereof that the controlling levers of the auxiliary frame may be positioned adjacent the driver's seat where they may be easily reached.

Another object of the invention is to so construct the motor driven mechanism that the machine may be driven across a field without the cutting knives moving and to further so construct the mechanism that the motor may be left running without the machine being moved or the cutting mechanism moved.

Another object of the invention is to provide improved brake mechanism for the driven shaft from which rotary movement is conveyed to the driving wheels of the machine and from which movement is transmitted to the cutting knives so that rotary movement of the shafts may be stopped and thus brakes applied to the machine.

Another object of the invention is to so construct this motor operating mechanism that the controlling levers thereof may be positioned adjacent the driver's seat, and to so construct the brake operating mechanism that the foot treadle thereof may be positioned adjacent the driver's seat.

This improved mowing machine is illustrated in the accompanying drawings, wherein:—

Figure 1:
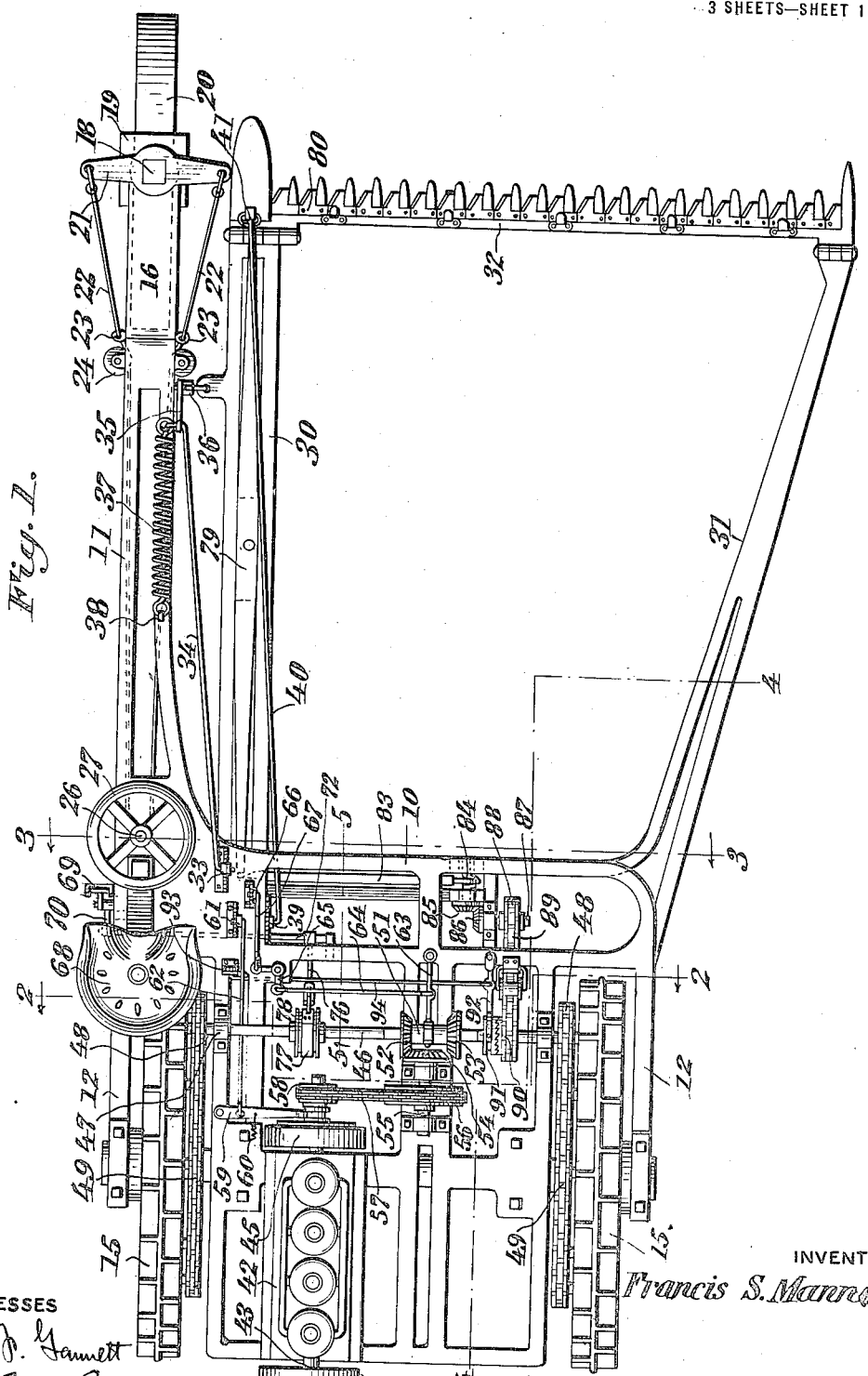
Figure 2:
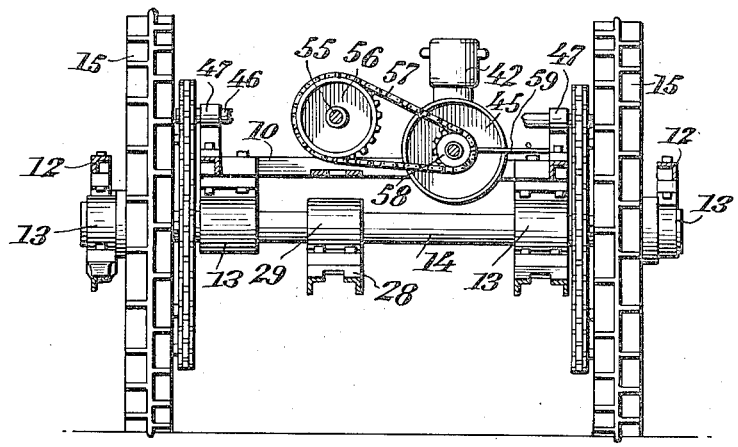
Figure 3:
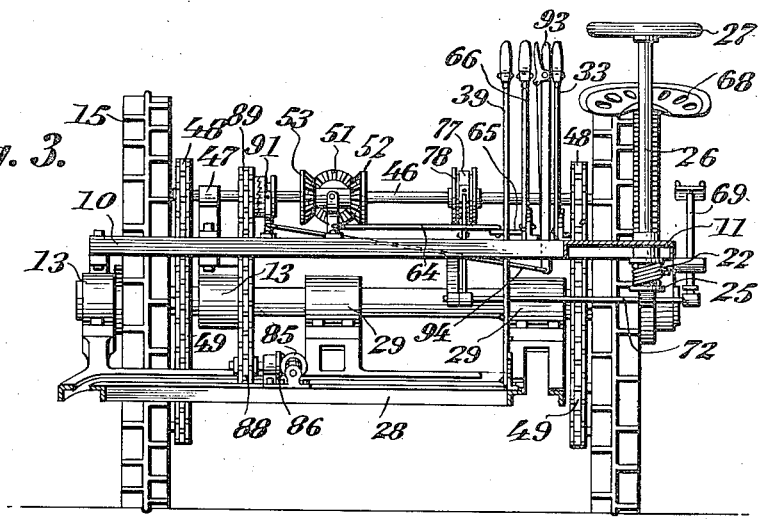

Figure 1 is a view showing the improved machine in top plan. Fig. 2 is a transverse sectional view taken along the line 2—2 of Fig. 1 with certain portions of the operating mechanism left out for the sake of clearness. Fig. 3 is a sectional view taken along the line 3—3 of Fig. 1 with certain portions of the operating mechanism left out for the sake of clearness. Fig. 4 is a longitudinal sectional view taken along the line 4—4 of Fig. 1 with certain portions of the operating mechanism left out for sake of clearness. Fig. 5 is a fragmentary sectional view taken along the line 5—5 of Fig. 1 to illustrate the brake mechanism. Fig. 6 is a fragmentary view in top plan showing the pitman connected with the rocker arm of the cutting knives. Fig. 7 is fragmentary sectional view taken along the line 7—7 of Fig. 1 to show the manner of connecting the rocker arm with the cutting knives.

The main frame indicated in general by the numeral 10 is provided with a forwardly extending arm 11 and rearwardly extending side arms 12 which carry bearings 13 for the shaft 14 upon which the rear supporting and driving wheels 15 are mounted. The forward end portion 16 of the arm 11 extends upwardly as shown in Fig. 4 and terminates in a bearing 17 in which is rotatably mounted, the stem 18 of the forks 19 which carry the forward supporting wheels 20. The upper end portion of this stem 18 is squared as clearly shown in Fig. 1 and carries a yoke arm 21 with which the guiding lines 22 are connected. These guiding lines 22 pass through the eyes 23 and around the pulleys 24 and are wound upon the drum 25 of the steering shaft 26 and it will be seen that when this shaft is turned by means of the hand wheel 27, the steering or guiding lines will be moved to turn the guiding wheel 20 and thus direct the movement of the machine across the field.

The auxiliary frame indicated in general by the numeral 28 is provided with bearings 29 to pivotally connect the auxiliary frame with the axle 14 and is provided with side arms 30 and 31 to the outer or forward ends of which is pivotally connected the sickle bar 32. A latch lever 33 carried by the main frame is provided with a draw rod 34 connected with the bell crank lever 35 so that by moving this latch lever, the bell crank lever may be rocked upon its pivot and through the medium of the suspending chain 36 support the auxiliary frame at the desired height. A spring 37 is connected at one end with the eye 38 of the main frame and at its opposite end with the bell crank lever in order to yieldably hold the bell crank lever in a normal position with the auxiliary frame raised out of engagement with the ground. A latch lever 39 is carried by the auxiliary frame and has its draw-rod 40 connected with the sickle bar as shown at 41 thus permitting the sickle bar to be swung upwardly to an inoperative position without it being necessary to raise the auxiliary frame. It will thus be seen that if desired the sickle bar can be swung upwardly in order to pass over a slight obstruction and that if it is desired to pass over a relatively large obstruction, the entire auxiliary frame can be swung upwardly. The entire frame could also be swung upwardly when conveying the machine from one field to another or when the machine is not in use.

A gasolene engine 42 is mounted upon the rear portion of the main frame 10 and has its shaft 43 extending beyond the forward and rear ends of the engine, fly wheels 44 and 45 being mounted upon the engine shaft and the fly wheel serving as a pulley so that when desired a belt may be passed around this pulley and a threshing machine or any other machine driven through the medium of the gasolene engine 42. A driven shaft 46 is journaled in the bearing and carries sprocket wheels 48 about which pass sprocket chains 49 which chains pass around large sprocket wheels 50 carried by the supporting wheels 15. It will thus be seen that when this driven shaft is rotating the machine may be moved across a field. In order to permit the machine to be driven forwardly or rearwardly, there is provided a sliding clutch sleeve 51 which turns with the shaft 46 and is provided with gears 52 and 53 positioned upon opposite sides of a gear 54. This gear 54 is carried by a shaft 55 journaled in bearings carried by the main frame and carries a sprocket wheel 56 about which passes a sprocket chain 57. This sprocket chain 57 passes around a small sprocket wheel 58 forming part of a clutch. This clutch is engaged by an actuating lever 59 yieldably held in a normal position by means of the spring 60 so that the clutch will be normally held in a position to permit rotary movement to be transmitted to the shaft 55 through the medium of the sprocket chain 57. In order to move the clutch to an inoperative position, there is provided a latch lever 61 connected with the actuating lever by means of the draw rod 62. It will thus be seen that when it is desired to make use of the engine for driving a separate piece of machinery through the medium of a belt passed around the pulley wheel 44, the clutch 58 may be thrown out of an operative position. It will be further noted that when the clutch is in an operative position, the rotation of shaft 46 can be controlled through movement of the clutch sleeve 51 in order to selectively bring gears 52 and 53 into engagement with the gear 54. This clutch sleeve is connected with the shifting lever 63 pivotally connected with the main frame and engaged by a draw-rod 64 leading from the bell crank lever 65 which in its turn is connected with the latch lever 66 by means of draw-rod 67. Therefore by movement of the latch lever, the clutch sleeve can be moved and the mowing machine can be driven either forwardly or rearwardly according to the wishes of the occupant occupying the driver's seat 68. It will be noted that all of these actuating levers are positioned adjacent the driver's seat where they can be easily reached.

In order to provide brake means for the mowing machine, there has been provided a foot treadle 69 which is pivotally connected with the main frame and has its lower end portion 70 connected with the short lever arm 71 of the shaft 72 by means of the link 73. It will be seen that when pressure is applied to the foot lever or treadle 69, the shaft 72 will be rotated and the arm 74 of this shaft swung downwardly thus drawing upon the rod or link 75 as shown in Fig. 5 and moving the lever arm 76 to tighten the brake strap 77 about the drum 78 mounted upon the driven shaft 46. A very efficient brake has therefore been provided in order to bring the mowing machine to a stop if desired.

The rocker arm 79 which has its forward end portion connected with the cutting knives 80 by means of the ball and socket connection 81, has its rear end portion connected with the pitman 82 by means of a ball and socket connection 83 so that as the pitman 82 is reciprocated through rotary movement of the crank shaft 84, the cutting knives will be moved longitudinally of the sickle bar. This crank shaft 84 is journaled through the auxiliary frame and carries a beveled gear 85 which meshes with a beveled gear 86 carried by the shaft 87. This shaft 87 carries a sprocket wheel 88 about which there passes a sprocket chain 89 so that rotary movement can be transmitted from the shaft 46 to the shaft 87 through the medium of this sprocket chain 89 which also passes around a sprocket wheel 90 carried by the shaft 46. This sprocket wheel 90 is provided with a clutch as shown in Fig. 1 so that when the clutch 91 is in engagement with the clutch of the sprocket wheel, the sprocket wheels will be rotated with the shaft 46. An actuating lever 92 is pivotally connected with the main frame and engages this clutch 91, the actuating lever being connected with the latch lever 93 by means of the draw rod 94 also located near the driver's seat where it may be conveniently reached. It will thus be seen that the driver can very easily throw the clutch into and out of an operative position and therefore when so desired, the machine may be driven across a field without the cutting mechanism being in operation.

When in use, the engine will be started and the machine can be driven to the field where it is to be used with the auxiliary frame raised and the clutches moved so that the cutting mechanism will not operate. As soon as the field is reached where the machine is to be used, the auxiliary frame will be swung downwardly to the proper point and the clutches then moved so that the cutting mechanism will be operated as the machine is driven across the field. At any time desired, the sickle bar or the entire auxiliary frame can be swung upwardly in order to clear an obstruction and then lowered after the obstruction is passed. The cutting mechanism can also be rendered inoperative when making a turn if desired thus permitting the easy turning of the machine. After the machine is no longer to be used or if it is desired to move the machine to a second field this can be easily done. If the machine is stored, the clutches may be shifted and the engine then used for other purposes.

What is claimed is:—

A mowing machine including a frame, supporting wheels for said frame, cutting means carried by said frame, actuating means for said cutting means including a driven shaft, a driving shaft carried by said frame, means for transmitting rotary movement from said driving shaft to said supporting wheels, means for transmitting rotary movement from said driving shaft to said driven shaft, a clutch slidably mounted upon said driving shaft and provided with beveled gears, a second driven shaft provided with a gear extending between the gears of said clutch, means for rotating said second driven shaft, means for shifting said clutch to bring a selected gear into engagement with the gear of said last mentioned driven shaft, a brake drum carried by said driving shaft, a brake band passing around said drum, a tightening lever connected with the ends of said brake band for drawing the brake band into tight engagement with said drum, a rocker shaft rotatably connected with said frame, a link connecting said rocker shaft with said tightening lever, and means for moving said rocker shaft into and out of a position to tighten said brake band.

In testimony whereof I affix my signature in presence of two witnesses.

FRANCIS S. MANNON.

Witnesses:
W. S. WHITTEN,
M. S. BRADLEY.